United States Patent
Potteiger et al.

(10) Patent No.: US 6,263,143 B1
(45) Date of Patent: Jul. 17, 2001

(54) PACKAGE HOUSING FOR LASER MODULE WOUND ON A SPOOL

(75) Inventors: Brian Dale Potteiger, Reading; Rory Keene Schlenker, Lenhartsville, both of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/173,318

(22) Filed: Oct. 15, 1998

(51) Int. Cl.⁷ .................................................. G02B 6/36
(52) U.S. Cl. ................................ 385/135; 385/92
(58) Field of Search .............................. 385/135, 134, 385/92.88; 242/597.5, 400.1, 402, 406

(56) References Cited

U.S. PATENT DOCUMENTS

| | | | |
|---|---|---|---|
| 4,429,839 | * 2/1984 | Jessamine | 246/96 |
| 4,840,449 | * 6/1989 | Ghandeharizadeh | 385/135 |
| 4,861,134 | * 8/1989 | Alameel et al. | 385/135 |
| 5,486,922 | * 1/1996 | Cordova | 356/350 |
| 5,646,775 | * 7/1997 | Delrosso et al. | 359/341 |
| 5,703,990 | * 12/1997 | Robertson et al. | 385/135 |
| 6,007,018 | * 12/1999 | Potteiger et al. | 242/597.5 |
| 6,034,850 | * 3/2000 | Del Genio et al. | 360/132 |

* cited by examiner

Primary Examiner—John D. Lee
Assistant Examiner—Ellen Kim
(74) Attorney, Agent, or Firm—Gibbons, Del Deo, Dolan, Griffinger & Vecchione

(57) ABSTRACT

A package housing that is used to retain a wound spool and prevent a wound element from falling away from the spool. The housing includes a base segment having a hub disposed thereon and a recessed area surrounding the hub. The hub is sized to pass into the bottom end of the spool, thereby causing the spool to rest in the recessed area of the base segment of the housing. A cover segment is provided for covering the base segment of the housing and the spool. As a result, the spool becomes interposed between the base segment and the cover segment of the housing. A plurality of feed-through ports are defined between the base segment and the cover of the housing. The first end and the second end of the wound flexible element extend through two of the feed-through ports to points external of the housing.

21 Claims, 2 Drawing Sheets

PACKAGE HOUSING FOR LASER MODULE WOUND ON A SPOOL

RELATED APPLICATIONS

This application is related to co-pending U.S. patent application Ser. No. 09/173,283 filed Oct. 15, 1998, and entitled, Device And Method For Retaining A Laser Module In An Orientation Suitable For Testing And Shipping (Potteiger 7-1-3).

This application is also related to U.S. Pat. No. 6,007,018 entitled Spool Support Assembly For The Optical Fiber Of A Laser Module.

BACKGROUND OF THE INVENTION

1. Field of the Invention

The present invention relates to shipping casings, packages and other storage compartments that are specifically shaped to retain a certain object. More particularly, the present invention relates to shipping casings, packages and storage compartments configured to retain a laser module assembly.

2. Description of the Related Art

There are many different applications that utilize optical fibers. In an optical fiber system, a laser source is typically used to generate a light signal. The light signal is then propagated through an optical fiber that is attached to the laser source.

In the telecommunications industry, solid state laser sources are commonly manufactured and sold as part of premanufactured module assemblies that are typically referred to as laser modules. In these modules, a solid state laser is attached to a segment of optical fiber. The optical fiber terminates at its free end with some type of fiber optic connector. In this manner, the laser module can be readily integrated into an existing electro-optical system. An example of such a laser module is the Laser 2000 Module, manufactured and sold by Lucent Technologies of Murray Hill, N.J., the assignee herein.

In co-pending U.S. patent application Ser. No. 09/173, 283, filed Oct. 15, 1998, and entitled Device And Method For Retaining A Laser Module In An Orientation Suitable For Testing And Shipping, a support device for a laser module is disclosed. The support device contains a baseplate onto which can be attached a removable spool. The baseplate retains the solid state laser and optical connector of the laser module. The spool retains the optical fiber that interconnects the solid state laser to the optical connector.

In U.S. Pat. No. 6,007,018, entitled Spool Support Assembly For The Optical Fiber Of A Laser Module, a device is disclosed that assists in the winding of an optical fiber from a laser module onto a spool. After the optical fiber of a laser module is wound onto a spool, the wound spool is transferred to a location where the wound spool can be assembled into the laser module support device. When an optical fiber is wound onto a spool, the optical fiber must be held in place on the spool until the spool is assembled into the laser module support assembly. If the optical fiber is not held in place, the optical fiber will either fall away from the spool or unwind from the spool. Accordingly, great care must be taken in transporting the wound spool.

A need therefore exists for a package housing for the wound spool that would prevent the wound optical fiber from falling away from the spool or unwinding from the spool. This would allow the wound spool to be much more easily handled as it is transferred from the point of winding to the point where the wound spool is assembled into the laser module support assembly.

SUMMARY OF THE INVENTION

The present invention is a package housing that is used to retain a spool wound with an optical fiber or some other flexible element. The present invention also includes the assembly of the spool in the package housing.

The spool has a cylindrical wall with a top end and a bottom end. A flange radially extends from at least a portion of the top end of the cylindrical wall. A length of flexible element is wound around the spool. However, the wound element is free to fall away from the spool if not held in place.

A housing is provided to prevent the wound element from falling away from the spool. The housing includes a base segment having a hub disposed thereon and a recessed area surrounding the hub. The hub is sized to pass into the bottom end of the cylindrical wall of the spool, thereby causing the spool to rest in the recessed area of the base segment of the housing. A cover segment is provided for covering the base segment of the housing and the spool. As a result, the spool becomes interposed between the base segment and the cover segment of the housing. A plurality of feed-through ports are defined between the base segment and the cover of the housing. The first end and the second end of the flexible element extend through two of the feed-through ports to points external of the housing.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention device and method can be used to retain many different types of wound spools, the present invention is particularly useful in winding the optical fiber of a laser module around a dedicated spool. Accordingly, by way of example, the present invention device and method will be described within the context of retaining a spool wound with the optical fiber of a laser module.

Figure 1:
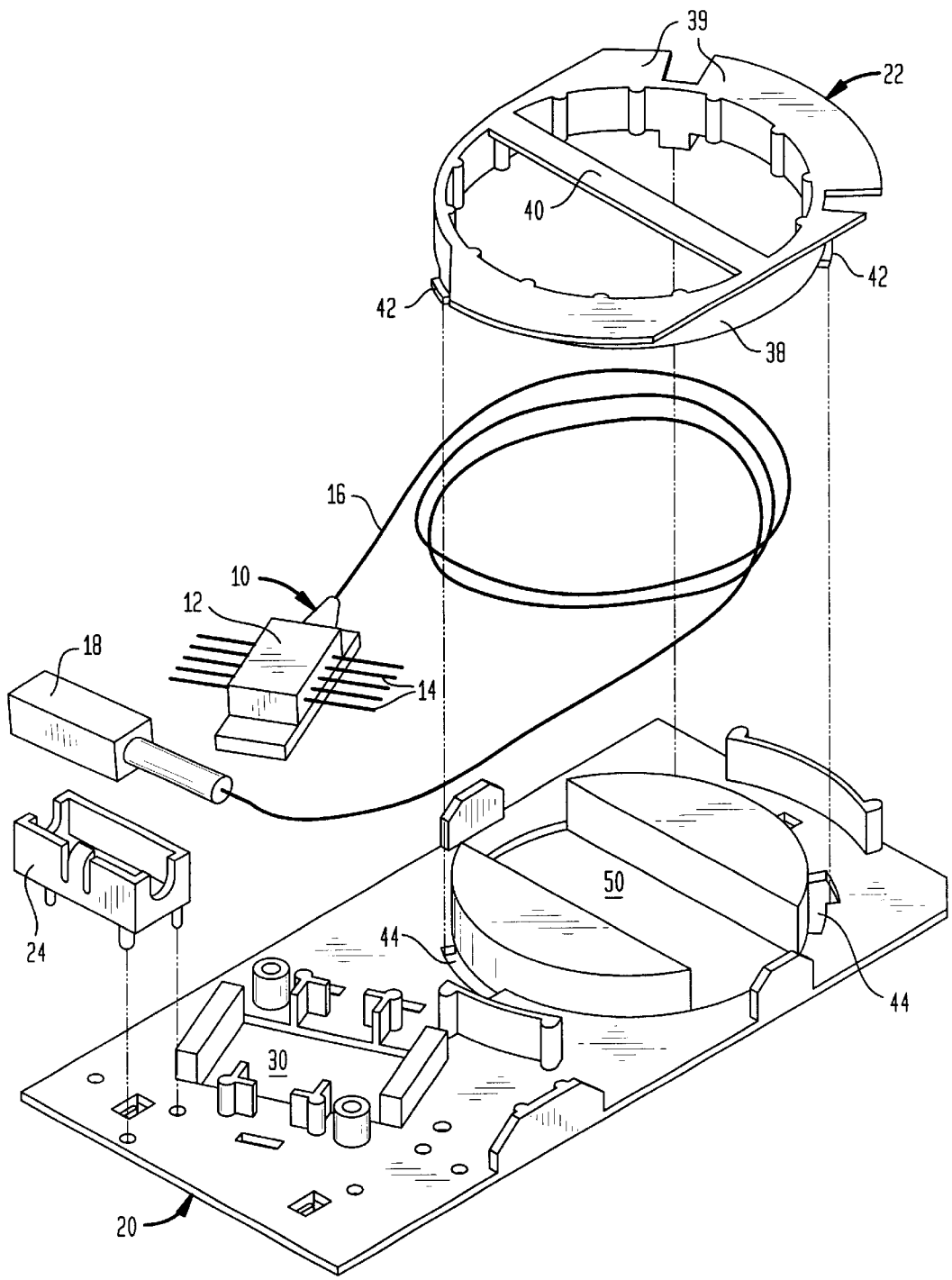
FIG. 1 is an exploded view of an exemplary embodiment of a laser module shown in conjunction with a support device.

Referring to FIG. 1, a prior art laser module 10 is shown. The laser module 10 is a Laser 2000 Module manufactured by Lucent Technologies, the assignee herein. The shown laser module 10 contains a solid state laser 12. The laser 12 itself has multiple conductive leads 14 that extend outwardly from opposing sides of the solid state laser 12. The conductive leads 14 are used to both power and control the laser 12 during its operation. The conductive leads 14 are also used to power, control and test the laser 12 during its manufacture.

An optical fiber 16 extends from the solid state laser 12. The optical fiber 16 receives the laser light generated by the solid state laser 12 and propagates that light to its free end. The optical fiber 16 can be of any length. However, in many applications the length of the optical fiber 16 is typically less than 80 inches. The free end of the optical fiber 16 terminates with an optical connector 18. Many different types of optical connectors can be used depending upon the needs of a customer ordering the laser module 10.

In FIG. 1, a support assembly is also shown. The support assembly is fully described in co-pending U.S. patent application Ser. No. 09/173,283 filed Oct. 15, 1998, entitled Device And Method For Retaining A Laser Module In An Orientation Suitable For Testing And Shipping, where the application is herein incorporated by reference. The support assembly retains the laser module 10 in a set position while the laser module 10 is tested and shipped by the manufacturer. The support assembly includes a baseplate 20, a spool 22 and a connector holder 24.

The baseplate 20 contains a laser receptacle 30 that receives the solid state laser 12 of the laser module 10. As such, the laser receptacle 30 holds the solid state laser 12 in a known fixed position on the baseplate 20. The connector holder 24 receives the optical connector 18 of the laser module 10. The connector holder 18 attaches to the top surface of the baseplate 20. Accordingly, the connector holder 24 retains the optical connector 18 at a known fixed position on the baseplate 20.

The spool 22 receives the optical fiber 16 that extends between the solid state laser 12 and the optical connector 18. The spool 22 contains a cylindrical wall 38 around which the optical fiber 16 is wound. The top of the cylindrical wall 38 terminates with a segmented flange 39 that prevents the wound optical fiber 16 from passing over the top of the cylindrical wall 38. A cross element 40 spans across the center of the spool 22 in the same general plane as the flange 39.

Locking tabs 42 extend outwardly from the bottom edge of the cylindrical wall 38. The locking tabs 42 pass through slots 44 in the baseplate 20 and engage the bottom surface of the baseplate 20. The slots 44 are disposed at various points on the baseplate 20. The slots 44 are positioned and shaped to receive the locking tabs 42 on the bottom of the spool 22. As the spool is attached to the baseplate 20, the locking tabs 42 pass through the slots 44. As the spool 22 is rotated, the locking tabs 42 engage the bottom surface of the baseplate 20, thereby creating a mechanical connection between the spool 22 and the baseplate 20.

The spool 22 does not have a flange at its bottom end. Accordingly, before the spool 22 is attached to the baseplate 20, there is no physical barrier that prohibits the wound optical fiber 16 from falling off of the cylindrical wall 38 of the spool 38. As a result, the wound optical fiber 16 must be held onto the spool 22 until the spool 22 is attached to the baseplate 20. This makes the winding of spool 22 and the manipulation of the wound spool very difficult and time consuming.

Figure 2:
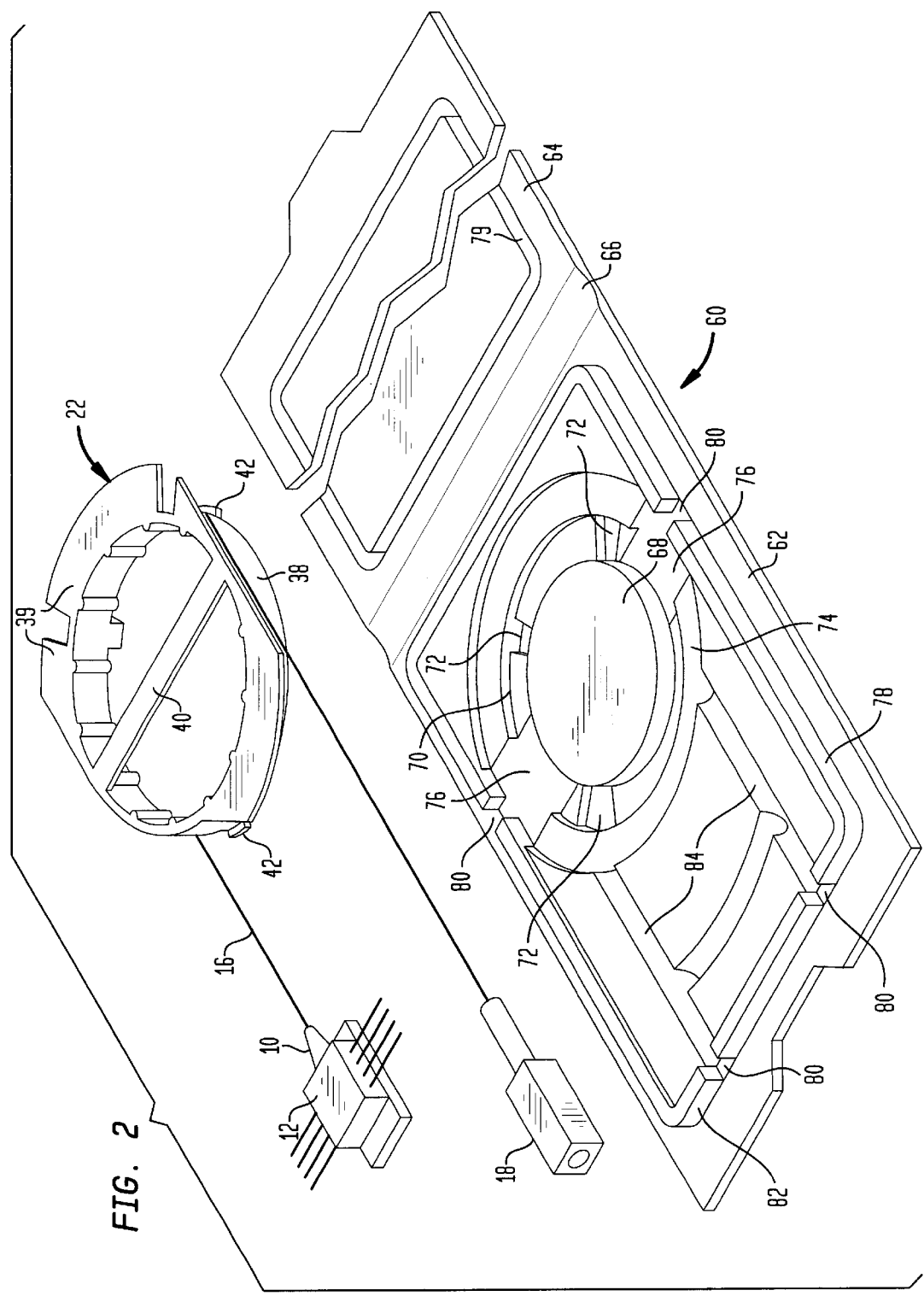
FIG. 2 is an exploded view of the exemplary embodiment of a package housing shown in conjunction with a laser module and the spool of a testing support device.

Referring to FIG. 2, an exemplary package housing 60 is shown in accordance with the present invention. The package housing 60 is configured to receive a spool 22 on which is wound the optical fiber 16 of a laser module 10. In the shown embodiment, the package housing 60 is a molded structure having two segments 62, 64 joined by an integral hinge 66. Accordingly, the package housing 60 has a clamshell design where one segment is capable of being folded over the opposite segment. The package housing 60 is preferably molded from a conductive plastic so as to be static charge dissipative.

The first segment 62 of the package housing 60 is configured to receive the spool 22 wound with the optical fiber 16 of the laser module 10. A hub 68 is formed in the first segment 62 of the package housing 60. The hub 68 is sized to fit within the cylindrical wall 38 of the spool 22 when the spool 22 is placed within the package housing 60. A groove 70 is disposed around the hub 68. The groove 70 is sized to receive the bottom end of the cylindrical wall 38 of the spool 22.

As has been previously described, locking tabs 42 extend from the bottom of the spool 22. The locking tabs 42 do not terminate in the same plane as does the remainder of the spool's cylindrical wall 38. Accordingly, depressions 72 are formed at points along the bottom of the groove 70 that correspond in position to the locking tabs 42. The locking tabs 42 pass into the depressions 72 when the spool 22 is placed within the package housing 60.

A depressed annular plateau 74 encircles the exterior of the groove 70. The annular plateau 74 provides space within the package housing 60 for the optical fiber 16 that is wound around the spool 22. Many different lengths of optical fiber 16 may be wound around the spool 22. As a result, the combined thickness of the wound optical fiber 16 on the spool 22 can vary widely throughout a predetermined range. The annular plateau 74 is wide enough to accept the full range of optical fiber lengths. Accordingly, when a wound spool 22 is set into the package housing 60, the package housing 60 does not interfere with the wound optical fiber 16.

In U.S. Pat. No. 6,007,018 entitled Spool Support Assembly For The Optical Fiber Of A Laser Module, it is explained that when the optical fiber 16 is wound around the spool 22, the optical fiber 16 slightly protrudes from the spool 22. The protruding optical fiber must be grasped and held in place when the wound spool 22 is manually handled. If the wound optical fiber is not manually held in place, the optical fiber will fall away from the spool 22 and will unwind. The disclosure of U.S. Pat. No. 6,007,018 is herein incorporated into this application by reference.

In FIG. 2, it can be seen that finger depressions 76 are formed in the first segment 62 of the package housing 60. The finger depressions 76 provide room for a person to grasp the sides of the wound spool 22 as the spool 22 is set in place within the package housing 60. Accordingly, the wound optical fiber 16 can be manually held in place on the spool 22 by a person's fingers when the spool 22 is removed from the package housing 60 and when the spool 22 is set into the package housing 60.

A closure protrusion 78 extends around the periphery of the first segment 62 of the package housing 60. The closure protrusion 78 enters a corresponding closure groove 79 formed around the periphery of the second segment 64 of the package housing 60. When the package housing 60 is closed, the closure protrusion 78 of the first segment 62 enters the closure groove 79 of the second segment 64 with a slight interference fit. As such, the closure protrusion 78 and the closure groove 79 act to provide a selectively openable mechanical interconnection between the first segment 62 and the second segment 64 of the package housing 60.

A plurality of feed-through ports 80 are formed in the closure protrusion 78. The feed-through ports 80 provide openings in the closure protrusion 78 that enable a segment of optical fiber 16 to freely pass through the closure protrusion 78 when the package housing 60 is closed. In the shown embodiment, four feed-through ports 80 are shown. However, it will be understood that any plurality of feed-through ports 80 can be used. Two of the shown feed-through ports 80 are disposed on the sides of the first segment 62 of the package housing 60 adjacent the finger reliefs 80. Two other shown feed-through ports 80 are disposed on the bottom edge 82 of the first segment 62 of the package housing 60. Conduits 84 lead to the feed-through ports 80 on the bottom edge 82. The conduits 84 intersect the groove 70 surrounding the hub 68 that retains the spool 22.

The optical fiber 16 wound around the spool 22 terminates at one end with a solid state laser 12 and terminates at the opposite end with an optical connector 18. The solid state laser 12 and the optical connector 18 do not go within the package housing 60. Rather, the solid state laser 18 and the optical connector 18 hang freely from the package housing 60 when the wound spool 22 is closed within the package housing 60. By enabling the solid state laser 12 and optical connector 18 to hang freely from the package housing 60, these elements can be worked upon and tested while the wound optical fiber is safely held within the package housing 60. Accordingly, great care no longer needs to be spent holding the optical fiber 16 on the spool 22 as the entire laser module 12 is manipulated. Rather, by retaining the wound optical fiber 16 and spool 22 in the package housing 60, the entire laser module 10 can be easily manipulated without concern of the optical fiber 16 falling away from the spool 22.

The optical fiber 16 passes through two of the feed-through ports 80 in order to reach both the solid state laser 12 and the optical connector 18. The conduits 84 enable the optical fiber 16 to reach the feed-through from the spool 22 without having the optical fiber 16 interfere with the ability of the package housing 60 to close.

It will be understood that the position of the various feed-through ports 80 and the various conduits 84 that led to the feed-through ports 80 can be altered as desired. The position of the feed-through ports 80 only determine where the optical fiber enters and exits the package housing 60.

To utilize the package housing 60, the package housing 60 is opened and a wound spool 22 is placed over the hub 68 on the first segment 62 of the package housing 60. The ends of the wound optical fiber that connect to the solid state laser 12 and the optical connector 18 are then led through various feed-through ports 80. Once the wound spool 22 is in position on the hub 68, the second segment 64 of the package housing 60 is closed over the first segment 62 and the spool 22. Once the package housing 60 is closed, the spool 22 is locked into a set position. In this set position, the first segment 62 of the package housing 60 acts as a bottom flange to the spool 22 and prevents the wound optical fiber 16 from falling away from the wound spool 22. The assembly can then be freely handled without concern to the optical fiber 16 falling away from the spool 22.

To remove the wound spool 22 from the package housing 60, the package housing 60 is opened and wound spool 22 is grasped by placing two fingers in the finger reliefs 76 on the side of the spool 22. With the fingers on the side of the wound spool 22, the optical fiber 16 can be held in place on the spool 22 as the spool 22 is removed from the package housing 60.

It will be understood that the embodiment of the present invention specifically shown and described is merely exemplary and that a person skilled in the art can make alternate embodiments using different configurations and functionally equivalent components. For example, the package housing itself can have many different configurations. Similarly, the two segments of the package housing can be separate units. All such alternate embodiments are intended to be included in the scope of this invention as set forth in the following claims.

What is claimed is:

1. A package housing device for retaining a spool wound with a length of flexible element, the length of flexible element having a first end and a second end, the spool having a cylindrical wall with a top end and a bottom end; a flange radially extending from at least a portion of said top end of said cylindrical wall; wherein said length of flexible element is wound around the spool, said device comprising:

a base segment having a hub disposed thereon and a recessed area surrounding said hub, wherein said hub is sized to pass into the bottom end of said cylindrical wall of the spool and the spool Tests in said recessed area on said base segment;

a cover segment for covering said base segment and causing the spool to be interposed between the base segment and the cover segment;

a plurality of feed-through ports defined between said base segment and said cover segment, wherein each feed-through port is sized to enable a segment of the flexible element to pass therethrough; and the first and second end of the flexible element extend through two of said feed-through ports therethrough to points external of said housing; and at least one conduit defined between said base segment and said cover segment that leads between each said feed-through port and said recessed area, wherein each conduit is sized to enable a segment of the flexible element to pass therethrough.

2. The device according to claim 1, wherein said cover segment is attached to said base segment with a hinged connection.

3. The device according to claim 1, wherein said cover segment and said base segment are both fabricated from a static dissipative material.

4. A package housing device for retaining a spool wound with a flexible element, said device comprising:

a base segment having a hub disposed thereon and a recessed area surrounding said hub, said recessed area surrounding said hub includes a groove disposed around said hub, said recessed area being for the resting of the spool thereon, wherein said hub is sized to pass into the spool, and said recessed plateau surrounding at least a portion of said groove, said recessed area being for snug fitting of the flexible element;

a cover segment for covering said base segment and causing the spool to be interposed between the base segment and the cover segment;

a plurality of feed-through ports defined between said base segment and said cover segment, wherein each feed-through port is sized to enable a segment of the flexible element to pass therethrough;

at least one conduit defined between said base segment and said cover segment that leads between each said feed-through port and said recessed area, wherein each conduit is sized to enable a segment of the flexible element to pass therethrough.

5. The device according to claim 4, wherein said recessed area further includes finger reliefs disposed on opposite sides of said hub that enable a person to grasp opposite sides of the spool when in said recessed area.

6. The device according to claim 4, wherein the spool has a cylindrical wall with a bottom edge and said groove is conformed to receive the bottom edge of the cylindrical wall.

7. The device according to claim 4, wherein the groove has a bottom surface and a plurality of depressions are disposed in said bottom surface of said groove at different points along said groove.

8. The package housing device of claim 4, said recessed area being for snug fitting of the flexible element and the flexible element being a passive optical fiber.

9. The package housing device of claim 8, said recessed area being for snug fitting of the flexible element and the flexible element being no longer than 80 inches.

10. The package housing device of claim 4, said package housing device being for retaining no more than one spool wound with a flexible element.

11. An assembly, comprising:
   i) a length of flexible element having a first end and a second end;
   ii) a spool having:
      a cylindrical wall with a top end and a bottom end;
      a flange radially extending from at least a portion of said top end of said cylindrical wall; wherein said length of flexible element is wound around the spool; and
   iii) a housing for retaining the spool and the length of flexible element wound therearound, said housing including:
      a base segment having a hub disposed thereon and a recessed area surrounding said hub, said hub being sized to pass into said bottom end of said cylindrical wall of said spool, wherein said spool rests in said recessed area;
      a cover segment for covering said base segment, wherein said spool is interposed between the base segment and the cover segment;
      a plurality of feed-through ports defined between said base segment and said cover segment, wherein said first end and said second end of said flexible element extend through two of said feed-through ports therethrough to points external of said housing.

12. The assembly according to claim 11, further including at least one conduit defined between said base segment and said cover segment that leads between each said feed-through port and said recessed area, wherein each conduit is sized to enable a segment of said flexible element to pass therethrough.

13. The assembly according to claim 11, wherein said cover segment of said housing is attached to said base segment of said housing with a hinged connection.

14. The assembly according to claim 13, further including locking tabs extending from said bottom end of said cylindrical wall of said spool.

15. The assembly according to claim 11, wherein said cover segment and said base segment are both fabricated from a static dissipative material.

16. The assembly according to claim 11, wherein said recessed area surrounding said hub includes a groove disposed around said hub and a recessed plateau surrounding at least a portion of said groove, wherein said groove is sized to receive said bottom end of the spool's cylindrical wall and said recessed area is sized to receive said flexible element wound around said spool.

17. The assembly according to claim 16, wherein locking tabs extend from said bottom end of said cylindrical wall of said spool, and said groove has a bottom surface and a plurality of depressions are disposed in said bottom surface of said groove to receive said locking tabs when said spool rests in said recessed area.

18. The assembly according to claim 11, wherein said recessed area further includes finger reliefs disposed on opposite sides of said hub that enable a person to grasp opposite sides of said spool when resting in said recessed area.

19. A method of transporting a laser module of the type having a solid state laser and an optical connector joined by a common passive optical fiber, said method comprising the steps of:
   winding said passive optical fiber on a spool in a manner that enables the solid state laser and the optical connector to hang free of the spool;
   positioning the spool in a housing including a base segment having a hub disposed thereon and a recessed area surrounding said hub, wherein said hub is sized to receive said spool therearound and said spool rests in said recessed area in a manner that prevents the passive optical fiber from disengaging the spool, wherein said solid state laser and said optical connector are external of said housing.

20. The method according to claim 19, wherein said housing is fabricated from a static dissipative material.

21. An assembly for retaining a laser module of the type having a solid state laser, an optical connector and an optical fiber extending between the laser and the optical connector, said assembly comprising:
   a baseplate having a top surface and a bottom surface;
   a spool disposed on said baseplate top surface and extending in the direction of said bottom surface, said spool being suitable for having the optical fiber wound therearound;
   a laser receptacle disposed on said baseplate top surface, said receptacle being sized to receive the laser in a first predetermined position and orientation therein; and
   a connector holder disposed on said baseplate top surface for receiving and retaining the optical connector therein at a second predetermined position and orientation therein.

* * * * *